United States Patent
Li et al.

(10) Patent No.: US 12,402,140 B2
(45) Date of Patent: Aug. 26, 2025

(54) SERVING CELL SCHEDULING METHOD, TERMINAL DEVICE, AND NETWORK DEVICE

(71) Applicant: VIVO MOBILE COMMUNICATION CO., LTD., Dongguan (CN)

(72) Inventors: Gen Li, Dongguan (CN); Xueming Pan, Dongguan (CN); Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 292 days.

(21) Appl. No.: 17/894,140

(22) Filed: Aug. 23, 2022

(65) Prior Publication Data

US 2022/0408473 A1 Dec. 22, 2022

Related U.S. Application Data

(63) Continuation of application No. PCT/CN2021/077598, filed on Feb. 24, 2021.

(30) Foreign Application Priority Data

Feb. 25, 2020 (CN) .................. 202010117361.X

(51) Int. Cl.
*H04W 74/08* (2024.01)
*H04W 24/08* (2009.01)
*H04W 72/23* (2023.01)

(52) U.S. Cl.
CPC .................. *H04W 72/23* (2023.01)

(58) Field of Classification Search
CPC ......... H04W 72/1289; H04W 72/1215; H04W 72/0453; H04W 72/23; H04W 74/0808;
(Continued)

(56) References Cited

U.S. PATENT DOCUMENTS

| 8,451,790 B2 * | 5/2013 | Dai ........ H04L 5/0053 370/252 |
| 2014/0254410 A1 * | 9/2014 | Seo ........ H04L 5/0055 370/252 |

(Continued)

FOREIGN PATENT DOCUMENTS

| CN | 101714892 A | 5/2010 |
| CN | 110475356 A | 11/2019 |

(Continued)

OTHER PUBLICATIONS

Extended European Search Report issued in related European Application No. 21761315.7, mailed Apr. 20, 2023, 11 pages.

(Continued)

*Primary Examiner* — Edan Orgad
*Assistant Examiner* — Vanneilian Lalchinthang
(74) *Attorney, Agent, or Firm* — IPX PLLC

(57) ABSTRACT

A serving cell scheduling method, a terminal device, and a network device are provided. The method includes: receiving first configuration information sent by a network device. The first configuration information is used to indicate that a first serving cell supports simultaneous execution of self-scheduling and cross component carrier scheduling. The method further includes determining, according to the first configuration information, a first scheduling resource for performing self-scheduling on the first serving cell and a second scheduling resource for performing cross component carrier scheduling on the first serving cell. The first scheduling resource and the second scheduling resource respectively include corresponding search spaces or candidate Physical Downlink Control Channels (PDCCHs).

18 Claims, 5 Drawing Sheets

(58) Field of Classification Search
CPC .... H04W 24/08; H04L 5/001; H04L 27/0006; H04L 5/0092; H04L 5/0094; H04L 5/0055; H04L 1/1861; H04L 1/1896
USPC ........................................................ 370/329
See application file for complete search history.

(56) References Cited

U.S. PATENT DOCUMENTS

| | | | |
|---|---|---|---|
| 2017/0135127 A1 | 5/2017 | Nogami et al. | |
| 2019/0357238 A1* | 11/2019 | Zhou | H04W 72/23 |
| 2019/0357262 A1* | 11/2019 | Cirik | H04W 80/02 |
| 2023/0036466 A1* | 2/2023 | Yoshioka | H04L 5/001 |
| 2023/0084554 A1* | 3/2023 | Shi | H04W 72/0453 370/329 |

FOREIGN PATENT DOCUMENTS

| | | | | |
|---|---|---|---|---|
| CN | 111901869 A | | 11/2020 | |
| EP | 3128801 A1 | * | 2/2017 | ......... H04L 27/0006 |
| WO | 2017166162 A1 | | 10/2017 | |
| WO | 2020001225 A1 | | 1/2020 | |

OTHER PUBLICATIONS

Ericsson, "Maintenance issues of physical downlink control channel", 3GPP Draft, R1-1809405, Aug. 2018, 14 pages.
International Search Report issued in corresponding International Application No. PCT/CN2021/077598, mailed Apr. 30, 2021, 4 pages.
Vivo, "Discussion on Scell scheduling P(S)cell.", 3GPP TSG RAN WG1 #102-e, R1-2005409., Aug. 2020.

* cited by examiner

SERVING CELL SCHEDULING METHOD, TERMINAL DEVICE, AND NETWORK DEVICE

CROSS-REFERENCE OF RELATED APPLICATION

This application is a continuation of International Application No. PCT/CN2021/077598, filed on Feb. 24, 2021, which claims priority to Chinese Patent Application No. 202010117361.X, filed on Feb. 25, 2020. The entire contents of each of the above-referenced applications are expressly incorporated herein by reference.

TECHNICAL FIELD

The present disclosure relates to the communications field, and in particular, to a serving cell scheduling method, a terminal device, and a network device.

BACKGROUND

At present, a New Radio (NR) system supports Carrier Aggregation (CA). In this way, multiple Component Carrier (CC) or cells can be configured and activated for User Equipment (UE, which can also be called terminal device). Besides, the NR system also supports cross carrier scheduling in the CA scenario.

However, a serving cell in the NR system supports scheduling by only one scheduling cell at the same time. At a same moment, the serving cell can only be self-scheduled or scheduled by another serving cell. For example, a Primary serving cell (Pcell) generally only supports scheduling by itself, which may result in a heavy load on a Physical Downlink Control Channel (PDCCH) in the Pcell, thereby affecting system performance.

SUMMARY

One of the technical problems solved by the embodiments of the present disclosure is that a serving cell in an NR system supports scheduling by only one scheduling cell at the same time, thereby affecting system performance.

In a first aspect, an embodiment of the present disclosure provides a serving cell scheduling method, applied to a terminal device. The method includes: receiving first configuration information sent by a network device, where the first configuration information is used to indicate that a first serving cell supports simultaneous execution of self-scheduling and cross component carrier scheduling; and determining, according to the first configuration information, a first scheduling resource for performing self-scheduling on the first serving cell and a second scheduling resource for performing cross component carrier scheduling on the first serving cell, where the first scheduling resource and the second scheduling resource respectively include corresponding search spaces or candidate PDCCHs.

In a second aspect, an embodiment of the present disclosure provides a terminal device. The terminal device includes: a receiving module, configured to receive first configuration information sent by a network device, where the first configuration information is used to indicate that a first serving cell supports simultaneous execution of self-scheduling and cross component carrier scheduling; and a scheduling module, configured to schedule, according to the first configuration information, a first scheduling resource for performing self-scheduling on the first serving cell and a second scheduling resource for performing cross component carrier scheduling on the first serving cell, where the first scheduling resource and the second scheduling resource respectively include corresponding search spaces or candidate PDCCHs.

According to a third aspect, an embodiment of the present disclosure provides a terminal device, including a processor, a memory, and a computer program stored in the memory and executable on the processor, and when the computer program is executed by the processor, steps of the method in the first aspect are implemented.

According to a fourth aspect, an embodiment of the present disclosure provides a computer-readable storage medium, where the computer-readable storage medium stores a computer program, and when the computer program is executed by a processor, steps of the method in the first aspect are implemented.

In a fifth aspect, an embodiment of the present disclosure provides a serving cell scheduling method, applied to a network device. The method includes: configuring first configuration information, where the first configuration information is used to indicate that a first serving cell supports simultaneous execution of self-scheduling and cross component carrier scheduling; and sending the first configuration information to a terminal device, where the first configuration information is used by the terminal device to determine a first scheduling resource for performing self-scheduling on the first serving cell and a second scheduling resource for performing cross component carrier scheduling on the first serving cell, and the first scheduling resource and the second scheduling resource respectively include corresponding search spaces or candidate PDCCHs.

In a sixth aspect, an embodiment of the present disclosure provides a network device. The network device includes: a configuration module, configured to configure first configuration information, where the first configuration information is used to indicate that a first serving cell supports simultaneous execution of self-scheduling and cross component carrier scheduling; and a sending module, configured to send the first configuration information to a terminal device, where the first configuration information is used by the terminal device to determine a first scheduling resource for performing self-scheduling on the first serving cell and a second scheduling resource for performing cross component carrier scheduling on the first serving cell, and the first scheduling resource and the second scheduling resource respectively include corresponding search spaces or candidate PDCCHs.

According to a seventh aspect, an embodiment of the present disclosure provides a network device, including a memory, a processor, and a computer program stored in the memory and executable on the processor, and when the computer program is executed by the processor, the steps of the method in the fifth aspect are implemented.

According to an eighth aspect, an embodiment of the present disclosure provides a computer-readable storage medium, where the computer-readable storage medium stores a computer program, and when the computer program is executed by a processor, the steps of the method in the fifth aspect are implemented.

In the embodiments of the present disclosure, the first scheduling resource required for performing self-scheduling on the first serving cell and the second scheduling resource required for performing cross component carrier scheduling on the first serving cell may be determined based on the first configuration information from the network device, and it can be learned based on the first configuration information that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

BRIEF DESCRIPTION OF DRAWINGS

The accompanying drawings described herein are used to provide further understanding of the present disclosure and constitute a part of the present disclosure. The exemplary embodiments of the present disclosure and descriptions thereof are used to explain the present disclosure, and do not constitute an undue limitation on the present disclosure. In the accompanying drawings.

DETAILED DESCRIPTION

Figures 1, 2:
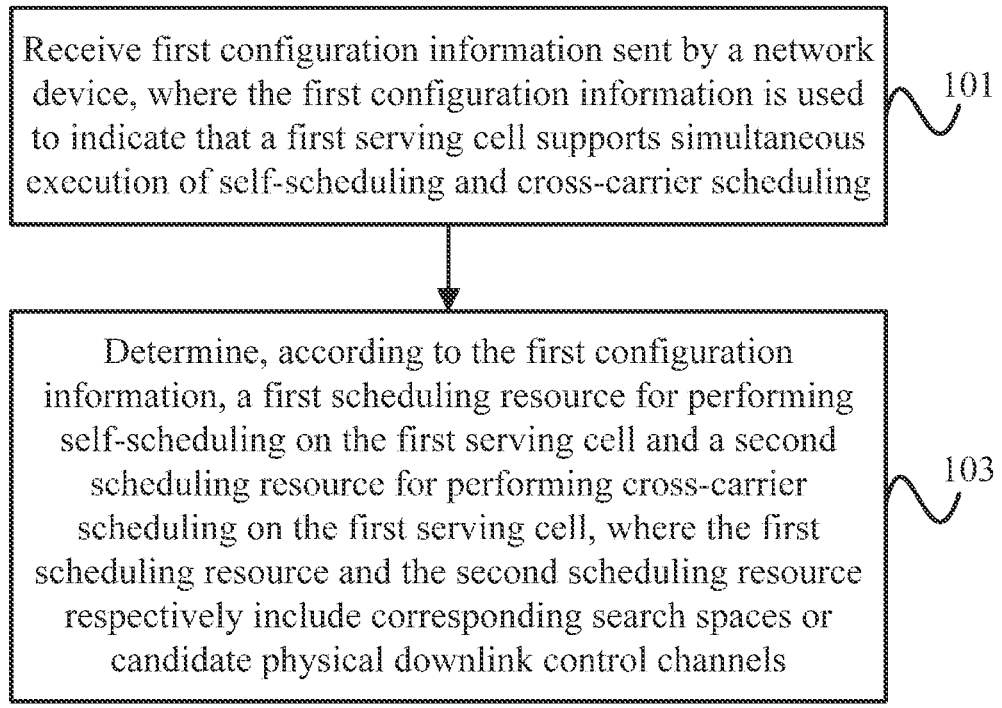
FIG. 1 is a schematic flowchart of a serving cell scheduling method in an embodiment of the present disclosure.
FIG. 2 is a schematic diagram of combining self-scheduling and cross component carrier scheduling of a serving cell in an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions of the present disclosure can be applied to various communications systems, such as Global System of Mobile communication (GSM), a Code Division Multiple Access (CDMA) system, Wideband Code Division Multiple Access (WCDMA), General Packet Radio Service (GPRS), Long Term Evolution (LTE)/Long Term Evolution Advanced (LTE-A), and NR.

UE, also referred to as a terminal device (Mobile Terminal), mobile user equipment, or the like, may communicate with one or more core networks through a Radio Access Network (RAN). The user equipment may be a terminal device, such as a mobile phone (or referred to as a "cellular" phone) and a computer with the terminal device. For example, the user equipment may be a portable, pocket-sized, handheld, computer built-in, or in-vehicle mobile apparatus, which exchanges voice and/or data with the radio access network.

The network device may also be called a base station, and may be a Base Transceiver Station (BTS) in GSM or CDMA, or may be a NodeB in WCDMA, or may be an evolved NodeB (evolutional Node B, eNB or e-NodeB) in LTE and a 5G base station (gNB).

In the embodiments of the present disclosure, a physical resource for PDCCH transmission is in unit of Control Channel Element (CCE), the size of one CCE is 9 Resource Element Groups (REGs), that is, 36 Resource Elements (REs), and a PDCCH may occupy 1, 2, 4 or 8 CCEs. For the four PDCCH sizes occupying 1, 2, 4, and 8 CCEs, tree-like aggregation may be used.

Each Aggregation Level (AL) defines a search space, including a Common Search Space (CSS) and a UE-specific Search Space (USS). UE performs blind detection on all possible PDCCH code rates in a search space according to a Downlink Control Information (DCI) format of a transmission mode of the UE. DCIformat0 is used to indicate the scheduling of a Physical Uplink Shared Channel (PUSCH), and DCIformat1 is used for a different mode of codeword scheduling of a Physical Downlink Shared Channel (PDSCH).

A search space is configured for each Bandwidth Part (BWP). The maximum number of search spaces that can be configured for one BWP is 10, and the maximum number of search spaces that can be configured for one cell is 40. Indexes of search spaces configured for a cell are all unique. When it is configured that a serving cell 1 is scheduled by a serving cell 2, an activated BWP configuration in the scheduled cell (that is, the serving cell 1) does not include configuration of the Radio Resource Control (RRC) optional field (for example, a time domain monitoring location) of the search space, and includes only configuration of the search space index and the number of candidate PDCCHs for blind detection at each aggregation level AL. A search space that is of search spaces configured on the activated BWP in the scheduling cell (that is, the serving cell 2) and that has the same index as that of the search space configured on the activated BWP in the scheduled cell is used as a search space for cross component carrier scheduling.

The technical solutions provided in the embodiments of the present disclosure are described in detail below with reference to the accompanying drawings.

Referring to FIG. 1, an embodiment of the present disclosure provides a serving cell scheduling method, executed by a terminal device, and the method includes the following process steps.

Step 101: Receive first configuration information sent by a network device, where the first configuration information is used to indicate that a first serving cell supports simultaneous execution of self-scheduling and cross component carrier scheduling.

Step 103: Determine, according to the first configuration information, a first scheduling resource for performing self-scheduling on the first serving cell and a second scheduling resource for performing cross component carrier scheduling on the first serving cell, where the first scheduling resource and the second scheduling resource respectively include corresponding search spaces or candidate physical downlink control channels PDCCHs.

In the embodiments of the present disclosure, the first scheduling resource required for performing self-scheduling on the first serving cell and the second scheduling resource required for performing cross component carrier scheduling on the first serving cell may be determined based on the first configuration information from the network device, and it can be learned based on the first configuration information that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

In the serving cell scheduling method according to the embodiments of the present disclosure, while the first serving cell performs self-scheduling based on the first scheduling resource, the second serving cell (that is, the scheduling cell) may be allowed to perform cross component carrier scheduling on the first serving cell (that is, the scheduled cell) based on the second scheduling resource.

In the serving cell scheduling method according to the embodiments of the present disclosure, the first scheduling resource may include at least one of the following (1) to (4).

(1) A first type of search space configured through an activated bandwidth part BWP in the first serving cell. That is, the first type of search space may be a search space for self-scheduling of the first serving cell, so as to specify a search space type. The first type of search space includes a CSS.

(2) A search space that is of search spaces corresponding to an activated BWP in the first serving cell and that is explicitly identified as self-scheduling. That is, configuration of one or some search spaces of search spaces corresponding to the activated BWP in the first serving cell is identified as a search space that can be used for self-scheduling.

(3) A search space that is of search spaces corresponding to an activated BWP in the first serving cell and that is implicitly identified as self-scheduling. That is, configuration of one or some search spaces of search spaces corresponding to the activated BWP in the first serving cell is implicitly identified as a search space that can be used for self-scheduling. For example, the configuration of the one or some search spaces includes a specific field (for example, a field used to indicate configuration of a PDCCH monitoring occasion (monitoring occasion)).

(4) A search space that is configured through an activated BWP in the first serving cell to monitor a first object, where the first object includes at least one of a first DCI format, a first Radio Network Temporary Identifier (RNTI), and a first time domain location.

At least one of the first DCI format, the first RNTI, and the first time domain location is related to the candidate PDCCH. The first DCI format may include DCI format 0_1 or DCI format 1_1, and the first RNTI may include System Information RNTI (SI-RNTI) or Configured Scheduling RNTI (CS-RNTI) or the like.

In the serving cell scheduling method according to the embodiments of the present disclosure, the first configuration information may further include other relevant information about the self-scheduling performed by the first serving cell. The other relevant information of the self-scheduling performed by the first serving cell may include: a carrier indicator field (Carrier Indicator Field, CIF) value in a downlink control information format (for example, DCI Format 0_1 or DCI Format 1_1).

In the serving cell scheduling method according to the embodiments of the present disclosure, the first configuration information may further include other relevant information for performing cross component carrier scheduling on the first serving cell, where the other relevant information for performing cross component carrier scheduling on the first serving cell may at least include: a cell identifier (ID) of the second serving cell and a CIF value for scheduling the first serving cell in the second serving cell.

In some embodiments, the CIF is used to determine a component carrier of a detected PDCCH.

In the serving cell scheduling method according to the embodiments of the present disclosure, when the first serving cell is a primary serving cell, a Secondary serving cell (Scell) may be used as a scheduling cell (that is, the second serving cell described above); and when the first serving cell is a secondary serving cell, the primary serving cell or another secondary serving cell can be used as a scheduling cell (that is, the second serving cell).

It should be noted that when the first serving cell is a primary serving cell and the primary serving cell supports simultaneous execution of self-scheduling and cross component carrier scheduling, PDCCH load in the Pcell can be effectively reduced, and system performance can be greatly improved especially in a dynamic spectrum sharing scenario.

In the serving cell scheduling method according to the embodiments of the present disclosure, when the first configuration information indicates that the first serving cell supports simultaneous execution of self-scheduling and cross component carrier scheduling, the indication herein may be an explicit indication or an implicit indication. That is, the network device can explicitly indicate to the terminal device through the first configuration information that the first serving cell supports simultaneous execution of self-scheduling and cross component carrier scheduling, or the network device can implicitly indicate to the terminal device through the first configuration information that the first serving cell supports simultaneous execution of self-scheduling and cross component carrier scheduling.

In an embodiment of the embodiments of the present disclosure, in a case that the first serving cell is a primary serving cell, the first configuration information includes a first configuration item, and that the first serving cell supports simultaneous execution of self-scheduling and cross component carrier scheduling is implicitly indicated by the network device to the terminal device through the first configuration item.

It can be understood that when the primary serving cell is configured to support simultaneous execution of self-scheduling and cross component carrier scheduling, the network device may implicitly indicate this to the terminal device through the first configuration information. In an example, the implicit indication is performed through the first configuration item in the first configuration information, where the first configuration item includes but is not limited to the other item.

In this embodiment, the first configuration item may be used to indicate other relevant information for performing self-scheduling by the first serving cell.

In an example, the first serving cell is a Pcell, and corresponding configuration information (equivalent to the first configuration information) may indicate that the Pcell can perform self-scheduling and cross component carrier scheduling at the same time, that is, while the Pcell performs self-scheduling, a Scell (that is, the second serving cell) performs cross component carrier scheduling on the Pcell.

The configuration information may further indicate a ScellID for scheduling the Pcell and a CIF value for scheduling the Pcell in the Scell.

In some embodiments, when configuring the Pcell, a configuration item (such as the other configuration item, that is, the first configuration item) in the configuration information can be used to implicitly indicate joint self-scheduling and cross component carrier scheduling; or an added new field (that is, the second configuration item) in the configuration information can be used to (explicitly) indicate joint self-scheduling and cross component carrier scheduling (that is, indicate that the Pcell supports self-scheduling and cross component carrier scheduling at the same time). For example, a new field of joint=own+other is added to scheduling cell information (scheduling Cell Info); or a new field of scheduling Cell Info2 is added to cross carrier scheduling configuration (Cross Carrier Scheduling Config). When scheduling Cell Info2 is configured, both the scheduling Cell Info and the scheduling Cell Info2 are referenced, for example, scheduling Cell Info is configured as own and scheduling Cell Info2 is configured as other; or scheduling Cell Info is ignored and only scheduling Cell Info2 is referenced, for example, scheduling Cell Info2 is configured as joint (=own+other).

Common search spaces configured on the activated BWP in the Pcell are all search spaces for self-scheduling, and the terminal device performs, in these search spaces configured in the Pcell, PDCCH blind detection on DCI 0_0 and DCI 1_0 scrambled by a C-RNTI, a CS-RNTI (if configured), or a modulation and coding scheme cell RNTI (Modulation and Coding Scheme Cell RNTI, MCS-C-RNTI) (if configured), to receive data. For a UE-specific search space, only a search space including a search space index and the number of candidate PDCCHs for blind detection at each aggregation level can be configured. A search space is configured on the activated BWP in the Scell, and the activated BWP in the Pcell includes a UE-specific search space that has the same search space index and that can be used for cross component carrier scheduling. As shown in FIG. 2, the shaded part represents a complete search space configuration, and the unshaded part represents a search space configuration that only includes the search space index and the number of candidate PDCCHs for blind detection. The complete search space configuration is a search space configuration that includes all specific fields (also called RRC optional fields). Otherwise, a search space configuration is an incomplete search space configuration, for example, a search space configuration that only includes the search space index and the number of candidate PDCCHs for blind detection. In some embodiments, some specific fields are used to configure time-frequency monitoring locations of the search space, including but not limited to a time domain monitoring period, a time domain monitoring location, and an associated frequency-domain Control Resource SET (CORESET).

Figure 3:
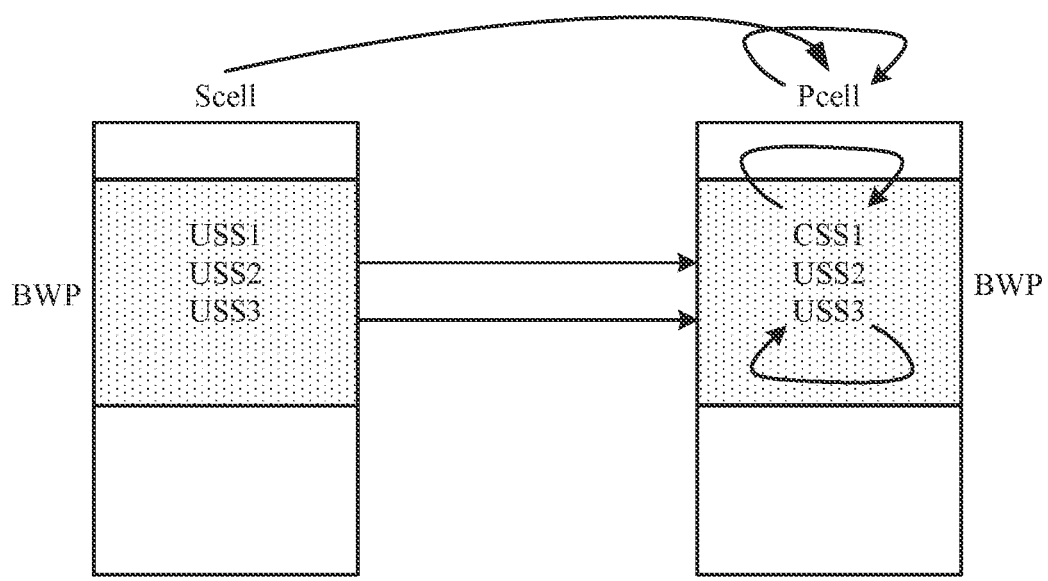
FIG. 3 is another schematic diagram of combining self-scheduling and cross component carrier scheduling of a serving cell in an embodiment of the present disclosure.

In some embodiments, the UE-specific search space including a complete configuration is a search space for self-scheduling by default, and only a search space that only includes the search space index and the number of candidate PDCCHs for blind detection at each aggregation level can correspond to a search space for cross component carrier scheduling. A search space is configured on the activated BWP in the Scell, and the activated BWP in the Pcell includes a UE-specific search space of an incomplete configuration that has the same search space index and that can be used for cross component carrier scheduling. As shown in FIG. 3, the shaded part represents a complete search space configuration, and the unshaded part represents a search space configuration that only includes the search space index and the number of candidate PDCCHs for blind detection.

In some embodiments, when the search space for self-scheduling or cross component carrier scheduling is explicitly configured in the Pcell, in the above figure, the shaded part represents a search space used for self-scheduling, and the unshaded part represents a search space used for cross component carrier scheduling.

In another embodiment of the embodiments of the present disclosure, in a case that the first serving cell is a primary serving cell or a secondary serving cell, the first configuration information includes a second configuration item, and that the first serving cell supports simultaneous execution of self-scheduling and cross component carrier scheduling is explicitly indicated by the network device to the terminal device through the second configuration item.

It can be understood that when the primary serving cell or the secondary serving cell is configured to support simultaneous execution of self-scheduling and cross component carrier scheduling, the network device may explicitly indicate this to the terminal device through the first configuration information. In an example, the explicit indication is performed through a second configuration item in the first configuration information, where the second configuration item includes but is not limited to an added new indicator field in the first configuration information.

In this embodiment, the second configuration item may be used to indicate other relevant information for performing cross component carrier scheduling on the first serving cell.

In an example, the first serving cell is a Pcell or a Scell 1, and corresponding configuration information (equivalent to the first configuration information) may indicate that the Pcell or Scell 1 can perform self-scheduling and cross component carrier scheduling at the same time, that is, while the Pcell or Scell 1 performs self-scheduling, a Scell 2 (that is, the second serving cell) performs cross component carrier scheduling on the Pcell.

Figure 4:
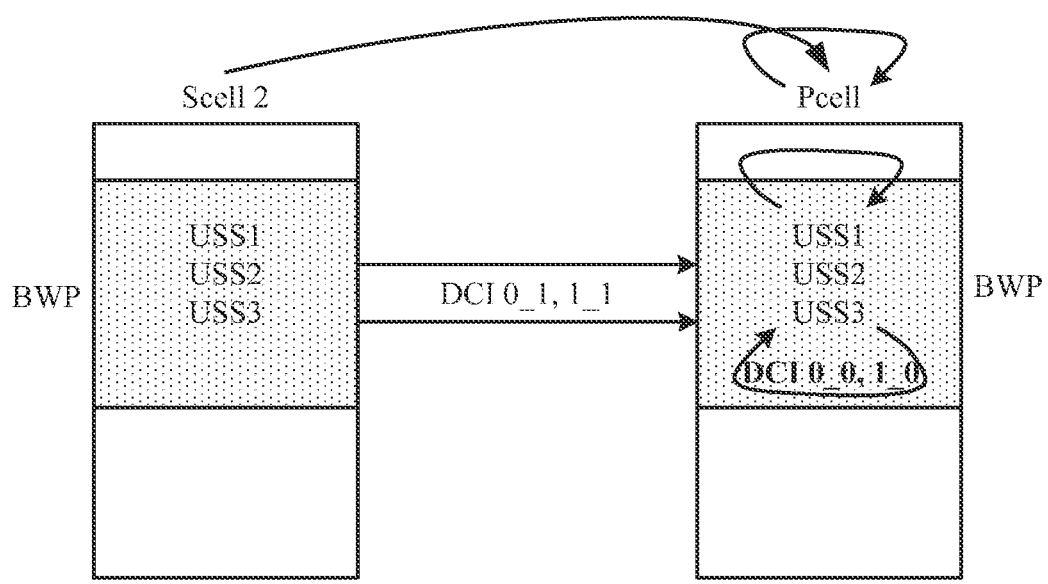
FIG. 4 is still another schematic diagram of combining self-scheduling and cross component carrier scheduling of a serving cell in an embodiment of the present disclosure.

In some embodiments, when the Pcell or Scell 1 is configured, joint self-scheduling and cross component carrier scheduling may be explicitly indicated through configuration information. The search space configuration configured on the activated BWP in the Pcell or Scell 1 can be used as mapping configuration of a search space for self-scheduling or a search space for cross component carrier scheduling, which can be distinguished by using a DCI format or an RNTI. Two numbers of candidate PDCCHs for blind detection can be configured in this search space, or the same configuration of the number of candidate PDCCHs for blind detection can be shared. As shown in FIG. 4, the USS3 configuration can be used to monitor DCI 0_0, DCI 1_0, DCI 0_1, and DCI 1_1. For example, monitoring of DCI 0_0 and DCI 1_0 is performed in USS3 configured in Pcell, and monitoring of DCI 0_1 and DCI 1_1 is performed in USS3 configured in Scell 2.

In some embodiments, in a case that monitoring time domain locations of the USS3 configured in the Pcell and Scell 2 completely overlap, some monitoring time domain locations may be used in the USS3 of Scell 2 to perform cross component carrier scheduling on Pcell, and some monitoring time domain locations may be used in the USS3 in Pcell for self-scheduling of Pcell.

In the serving cell scheduling method according to the embodiments of the present disclosure, to perform cross component carrier scheduling on the first serving cell while the first serving cell performs self-scheduling, the following step is further included: determining a second serving cell for scheduling the first serving cell.

In an example, the first configuration information includes a cell ID of the second serving cell for performing cross component carrier scheduling on the first serving cell, and the second serving cell may be determined based on the cell ID of the second serving cell included in the first configuration information. It should be noted that, during determining of the second serving cell, the solution described in the above example is included but constitutes no limitation.

In the serving cell scheduling method according to the embodiments of the present disclosure, the method may further include: receiving second configuration information that corresponds to the second serving cell and that is sent by the network device. The second configuration information includes relevant configuration information of the search space corresponding to the second serving cell, including but not limited to a search space index, a search space type, candidate PDCCH configuration, and other information.

Further, step 103 may include the following content: determining the second scheduling resource according to the first configuration information and the second configuration information.

It can be understood that when the first serving cell supports simultaneous execution of self-scheduling and cross component carrier scheduling, to avoid conflict of resources for self-scheduling and cross component carrier scheduling and smoothly perform cross component carrier scheduling on the first serving cell while the first serving cell performs self-scheduling, when determining the second scheduling resource for performing cross component carrier scheduling on the first serving cell, both the first configuration information and the second configuration information may be considered.

In the serving cell scheduling method according to the embodiments of the present disclosure, the second scheduling resource may include at least one of the following (1) to (4).

(1) A first search space configured through an activated BWP in the second serving cell, where the activated BWP in the first serving cell has a second type of search space that has a same index as that of the first search space. That is, the first search space is a second type of search space, so as to specify a search space type. The second type of search space includes USS. Besides, the BWP that needs to be activated in the first serving cell also includes a search space that has a same index and a same type as those of the first search space.

(2) A second search space configured through an activated BWP in the second serving cell, where the activated BWP in the first serving cell has a search space that has a same index as that of the second search space and that is explicitly identified as cross component carrier scheduling. That is, the configuration of one or some search spaces (that is, the second search space) of search spaces corresponding to the activated BWP in the second serving cell is identified as a search space that can perform cross component carrier scheduling. Besides, the activated BWP in the first serving cell needs to include a search space that has a same index as that of the second search space and that is explicitly identified as cross component carrier scheduling.

(3) A third search space configured by an activated BWP in the second serving cell, where the activated BWP in the first serving cell has a search space that has a same index as that of the third search space and that is implicitly identified as cross component carrier scheduling. That is, the configuration of one or some search spaces (that is, the third search space) of search spaces corresponding to the activated BWP in the second serving cell is implicitly identified as a search space that can perform cross component carrier scheduling. For example, the third search space only includes the search space index and the number of candidate PDCCHs for blind detection at each aggregation level. Besides, the activated BWP in the first serving cell needs to include a search space that has a same index as that of the third search space and that is implicitly identified as cross component carrier scheduling.

(4) A fourth search space configured by an activated BWP in the second serving cell to monitor a second object, where the activated BWP in the first serving cell has a search space that has a same index as that of the fourth search space, and the second object includes at least one of a second downlink control information (DCI) format, a second radio network temporary identifier, and a second time domain location.

At least one of the second DCI format, the second RNTI, and the second time domain location is related to the candidate PDCCH. The second DCI format may include DCI format 0_1 or DCI format 1_1, and the second RNTI may include a Cell RNTI (C-RNTI) and the like.

In the serving cell scheduling method according to the embodiments of the present disclosure, in a case that a search space of the second serving cell includes a first sub-scheduling resource for self-scheduling of the second serving cell and a second sub-scheduling resource for scheduling of the first serving cell, the first sub-scheduling resource includes some time domain monitoring locations or some candidate PDCCHs determined (or preconfigured) based on a first preset rule, and configure that the second sub-scheduling resource includes some time domain monitoring locations or some candidate PDCCHs determined (or preconfigured) based on a second preset rule. For example, when Cell 1 can schedule Cell 1 and Cell 2, some time domain monitoring locations of the search space configured in Cell 1 are used to self-schedule Cell 1, and other time domain monitoring locations are used to perform cross component carrier scheduling on Cell 2.

It can be understood that the scheduling resource of the scheduling cell for performing cross component carrier scheduling on the scheduled cell is specified, to help perform cross component carrier scheduling on the first serving cell while performing self-scheduling on the first serving cell.

In some embodiments, the first preset rule and the second preset rule are rules set based on time domain monitoring locations, such as, interval rules for time domain monitoring locations corresponding to self-scheduling and cross component carrier scheduling respectively.

Further, there may be a correlation between the first preset rule and the second preset rule, for example, time domain monitoring locations are numbered, odd-numbered time domain monitoring locations are used for self-scheduling of the first serving cell, and even-numbered time domain monitoring locations are used for cross component carrier scheduling of the first serving cell.

In some embodiments, the time domain monitoring location may include a slot, and a monitoring occasion, a period, and the like configured in a slot.

Figure 5:
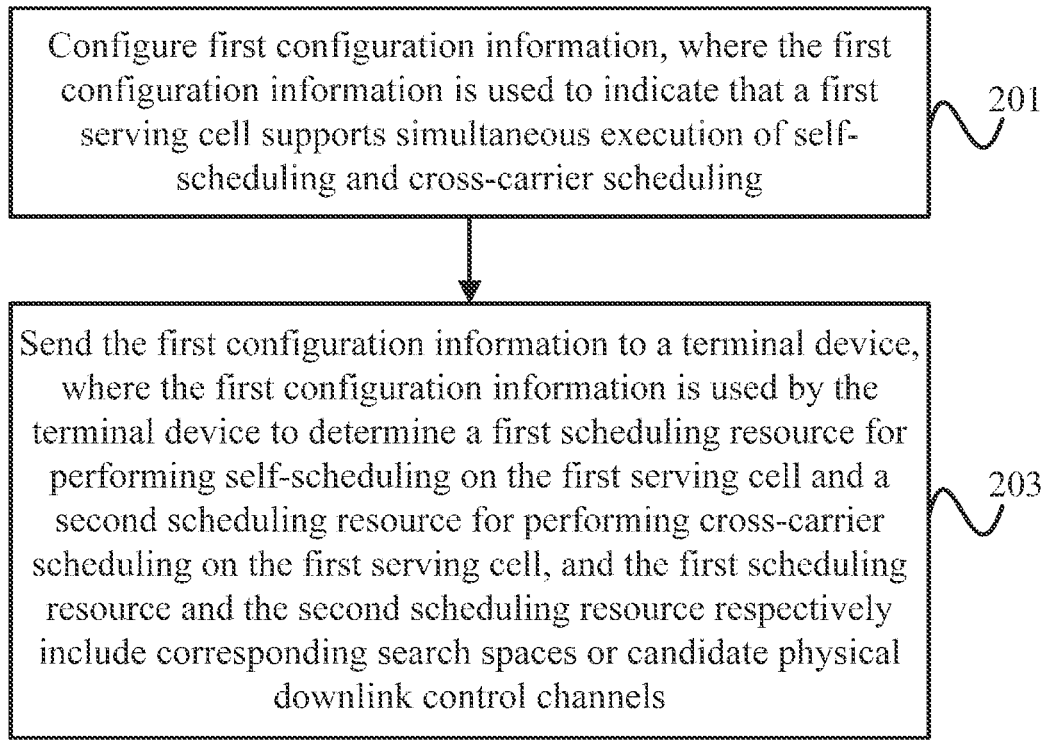
FIG. 5 is a schematic flowchart of a second serving cell scheduling method in an embodiment of the present disclosure.

Referring to FIG. 5, an embodiment of the present disclosure provides a serving cell scheduling method, executed by a network device, and the method includes the following process steps.

Step 201: Configure first configuration information, where the first configuration information is used to indicate that a first serving cell supports simultaneous execution of self-scheduling and cross component carrier scheduling.

Step 203: Send the first configuration information to a terminal device, where the first configuration information is used by the terminal device to determine a first scheduling resource for performing self-scheduling on the first serving cell and a second scheduling resource for performing cross component carrier scheduling on the first serving cell, and the first scheduling resource and the second scheduling resource respectively include corresponding search spaces or candidate PDCCHs.

In the embodiments of the present disclosure, the first configuration information may be provided to the terminal device, so that the first scheduling resource required for performing self-scheduling on the first serving cell and the second scheduling resource required for performing cross component carrier scheduling on the first serving cell may be determined by the terminal device, and the first configuration information may indicate that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

In the serving cell scheduling method according to the embodiments of the present disclosure, the first scheduling resource may include at least one of the following (1) to (4).

(1) A first type of search space configured through an activated bandwidth part BWP in the first serving cell. That is, the first type of search space may be a search space for self-scheduling of the first serving cell, so as to specify a search space type. The first type of search space includes a CSS.

(2) A search space that is of search spaces corresponding to an activated BWP in the first serving cell and that is explicitly identified as self-scheduling. That is, configuration of one or some search spaces of search spaces corresponding to the activated BWP in the first serving cell is identified as a search space that can be used for self-scheduling.

(3) A search space that is of search spaces corresponding to an activated BWP in the first serving cell and that is implicitly identified as self-scheduling. That is, configuration of one or some search spaces of search spaces corresponding to the activated BWP in the first serving cell is implicitly identified as a search space that can be used for self-scheduling. For example, the configuration of the one or some search spaces includes some specific fields (for example, a field used to indicate configuration of a PDCCH monitoring occasion).

(4) A search space that is configured through an activated BWP in the first serving cell to monitor a first object, where the first object includes at least one of a first downlink control information (DCI) format, a first RNTI, and a first time domain location.

At least one of the first DCI format, the first RNTI, and the first time domain location is related to the candidate PDCCH. The first DCI format may include DCI format 0_1 or DCI format 1_1, and the first RNTI may include an SI-RNTI or a CS-RNTI or the like.

In the serving cell scheduling method according to the embodiments of the present disclosure, the first configuration information may further include other relevant information about the self-scheduling performed by the first serving cell. The other relevant information of the self-scheduling performed by the first serving cell may include: a CIF value in a downlink control information format (for example, DCI Format 0_1 or DCI Format 1_1).

In the serving cell scheduling method according to the embodiments of the present disclosure, the first configuration information may further include other relevant information for performing cross component carrier scheduling on the first serving cell, where the other relevant information for performing cross component carrier scheduling on the first serving cell may at least include: a cell ID of the second serving cell and a CIF value for scheduling the first serving cell in the second serving cell. The cell ID of the second serving cell can be used by the terminal device to determine the second serving cell used for scheduling the first serving cell.

In some embodiments, the CIF is used to determine a component carrier of a detected PDCCH.

In the serving cell scheduling method according to the embodiments of the present disclosure, when the first serving cell is a Pcell, a Scell may be used as a scheduling cell (that is, the second serving cell described above); and when the first serving cell is a secondary serving cell, the primary serving cell or another secondary serving cell can be used as a scheduling cell (that is, the second serving cell).

It should be noted that when the first serving cell is a primary serving cell and the primary serving cell supports simultaneous execution of self-scheduling and cross component carrier scheduling, PDCCH load in the Pcell can be effectively reduced, and system performance can be greatly improved especially in a dynamic spectrum sharing scenario.

In the serving cell scheduling method according to the embodiments of the present disclosure, when the first configuration information indicates that the first serving cell supports simultaneous execution of self-scheduling and cross component carrier scheduling, the indication herein may be an explicit indication or an implicit indication. That is, the first configuration information can explicitly indicate to the terminal device that the first serving cell supports simultaneous execution of self-scheduling and cross component carrier scheduling, or the first configuration information can implicitly indicate to the terminal device that the first serving cell supports simultaneous execution of self-scheduling and cross component carrier scheduling.

In an embodiment of the embodiments of the present disclosure, in a case that the first serving cell is a primary serving cell, that the first serving cell supports simultaneous execution of self-scheduling and cross component carrier scheduling is implicitly indicated through a first configuration item in the first configuration information.

It can be understood that when the primary serving cell is configured to support simultaneous execution of self-scheduling and cross component carrier scheduling, the first configuration information may implicitly indicate this to the terminal device. In an example, the implicit indication is performed through the first configuration item in the first configuration information, where the first configuration item includes but is not limited to the other item.

In this embodiment, the first configuration item may be used to indicate other relevant information for performing self-scheduling by the first serving cell.

In another embodiment of the embodiments of the present disclosure, in a case that the first serving cell is a primary serving cell or a secondary serving cell, that the first serving cell supports simultaneous execution of self-scheduling and cross component carrier scheduling is explicitly indicated through a second configuration item in the first configuration information.

It can be understood that when the primary serving cell or secondary serving cell is configured to support simultaneous execution of self-scheduling and cross component carrier scheduling, the first configuration information may explicitly indicate this to the terminal device. In an example, the explicit indication is performed through a second configuration item in the first configuration information, where the second configuration item includes but is not limited to an added new indicator field in the first configuration information.

In this embodiment, the second configuration item may be used to indicate other relevant information for performing cross component carrier scheduling on the first serving cell.

In the serving cell scheduling method according to the embodiments of the present disclosure, to perform cross component carrier scheduling on the first serving cell while the first serving cell performs self-scheduling, the following content may be further included: configuring second configuration information corresponding to a second serving cell, where the second serving cell is used to schedule the first serving cell; and sending the second configuration information to the terminal device, where the second configuration information is used for the terminal device to determine the second scheduling resource. The second configuration information includes relevant configuration information of the search space corresponding to the second serving cell, including but not limited to a search space index, a search space type, candidate PDCCH configuration, and other information.

It can be understood that when the first serving cell supports simultaneous execution of self-scheduling and cross component carrier scheduling, to avoid conflict of resources for self-scheduling and cross component carrier scheduling and smoothly perform cross component carrier scheduling on the first serving cell while the first serving cell performs self-scheduling, the second configuration information corresponding to the second serving cell can be provided to the terminal device, so that when determining the second scheduling resource for performing cross component carrier scheduling on the first serving cell, the terminal device may consider both the first configuration information and the second configuration information.

In the serving cell scheduling method according to the embodiments of the present disclosure, the second scheduling resource may include at least one of the following (1) to (4).

(1) A first search space configured through an activated BWP in the second serving cell, where the activated BWP in the first serving cell has a second type of search space that has a same index as that of the first search space. That is, the first search space is a second type of search space, so as to specify a search space type. The second type of search space includes USS. Besides, the BWP that needs to be activated in the first serving cell also includes a search space that has a same index and a same type as those of the first search space.

(2) A second search space configured through an activated BWP in the second serving cell, where the activated BWP in the first serving cell has a search space that has a same index as that of the second search space and that is explicitly identified as cross component carrier scheduling. That is, the configuration of one or some search spaces (that is, the second search space) of search spaces corresponding to the activated BWP in the second serving cell is identified as a search space that can perform cross component carrier scheduling. Besides, the activated BWP in the first serving cell needs to include a search space that has a same index as that of the second search space and that is explicitly identified as cross component carrier scheduling.

(3) A third search space configured by an activated BWP in the second serving cell, where the activated BWP in the first serving cell has a search space that has a same index as that of the third search space and that is implicitly identified as cross component carrier scheduling. That is, the configuration of one or some search spaces (that is, the third search space) of search spaces corresponding to the activated BWP in the second serving cell is implicitly identified as a search space that can perform cross component carrier scheduling. For example, the third search space only includes the search space index and the number of candidate PDCCHs for blind detection at each aggregation level. Besides, the activated BWP in the first serving cell needs to include a search space that has a same index as that of the third search space and that is implicitly identified as cross component carrier scheduling.

(4) A fourth search space configured by an activated BWP in the second serving cell to monitor a second object, where the activated BWP in the first serving cell has a search space that has a same index as that of the fourth search space, and the second object includes at least one of a second DCI format, a second radio network temporary identifier, and a second time domain location.

At least one of the second DCI format, the second RNTI, and the second time domain location is related to the candidate PDCCH. The second DCI format may include DCI format 0_1 or DCI format 1_1, and the second RNTI may include a C-RNTI or the like.

In the serving cell scheduling method according to the embodiments of the present disclosure, in a case that a search space of the second serving cell includes a first sub-scheduling resource for self-scheduling of the second serving cell and a second sub-scheduling resource for scheduling of the first serving cell, the method further includes: configuring that the first sub-scheduling resource includes some time domain monitoring locations or some candidate PDCCHs determined (or preconfigured) based on a first preset rule, and configuring that the second sub-scheduling resource includes some time domain monitoring locations or some candidate PDCCHs determined (or preconfigured) based on a second preset rule.

It can be understood that the scheduling resource of the scheduling cell for performing cross component carrier scheduling on the scheduled cell is effectively configured, to help perform cross component carrier scheduling on the first serving cell while performing self-scheduling on the first serving cell.

In some embodiments, the first preset rule and the second preset rule are rules set based on time domain monitoring locations, such as, interval rules for time domain monitoring locations corresponding to self-scheduling and cross component carrier scheduling respectively. Further, there may be a correlation between the first preset rule and the second preset rule, for example, time domain monitoring locations are numbered, odd-numbered time domain monitoring locations are used for self-scheduling of the first serving cell, and even-numbered time domain monitoring locations are used for cross component carrier scheduling of the first serving cell.

In some embodiments, the time domain monitoring location may include a slot, and a monitoring occasion, a period, and the like configured in a slot.

Figure 6:
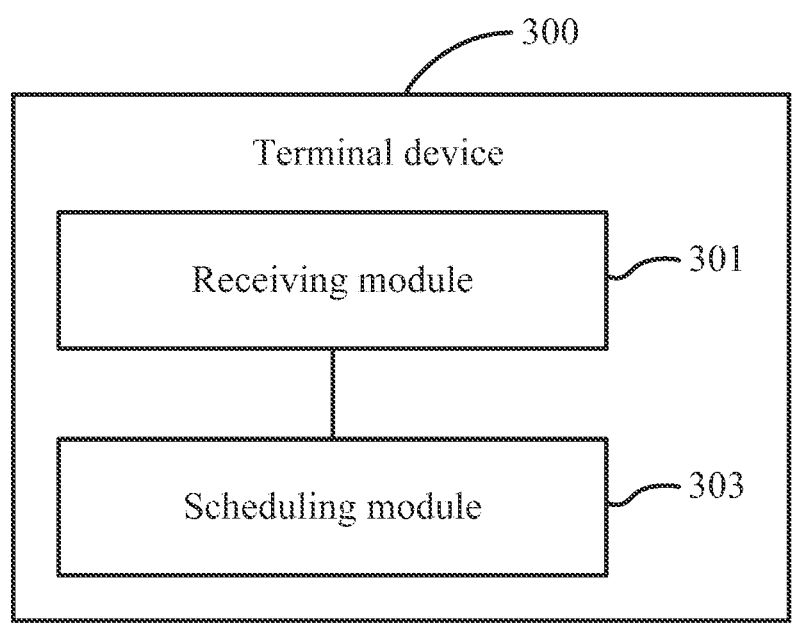
FIG. 6 is a schematic structural diagram of a terminal device in an embodiment of the present disclosure.

Referring to FIG. 6, an embodiment of the present disclosure provides a terminal device 300. The terminal device 300 includes: a receiving module 301 and a scheduling module 303.

The receiving module 301 is configured to receive first configuration information sent by a network device, where the first configuration information is used to indicate that a first serving cell supports simultaneous execution of self-scheduling and cross component carrier scheduling; and the scheduling module 303 is configured to schedule, according to the first configuration information, a first scheduling resource for performing self-scheduling on the first serving cell and a second scheduling resource for performing cross component carrier scheduling on the first serving cell, where the first scheduling resource and the second scheduling resource respectively include corresponding search spaces or candidate PDCCHs.

In the terminal device 300 in the embodiments of the present disclosure, in a case that the first serving cell is a primary serving cell, the first configuration information includes a first configuration item, and that the first serving cell supports simultaneous execution of self-scheduling and cross component carrier scheduling is implicitly indicated by the network device to the terminal device through the first configuration item.

In the terminal device 300 in the embodiments of the present disclosure, in a case that the first serving cell is a primary serving cell or a secondary serving cell, the first configuration information includes a second configuration item, and that the first serving cell supports simultaneous execution of self-scheduling and cross component carrier scheduling is explicitly indicated by the network device to the terminal device through the second configuration item.

In the terminal device 300 in the embodiments of the present disclosure, the first scheduling resource includes at least one of the following: a first type of search space configured through an activated bandwidth part BWP in the first serving cell; a search space that is of search spaces corresponding to an activated BWP in the first serving cell and that is explicitly identified as self-scheduling; a search space that is of search spaces corresponding to an activated BWP in the first serving cell and that is implicitly identified as self-scheduling; and a search space that is configured through an activated BWP in the first serving cell to monitor a first object, where the first object includes at least one of a first DCI format, a first radio network temporary identifier, and a first time domain location.

The terminal device 300 in the embodiments of the present disclosure may further include: a determining module, configured to determine a second serving cell for scheduling the first serving cell.

In the terminal device 300 in the embodiments of the present disclosure, the receiving module 301 may be further configured to receive second configuration information that corresponds to the second serving cell and that is sent by the network device; and the scheduling module 303 may be configured to determine the second scheduling resource according to the first configuration information and the second configuration information.

In the terminal device 300 in the embodiments of the present disclosure, the second scheduling resource includes at least one of the following: a first search space configured through an activated BWP in the second serving cell, where the activated BWP in the first serving cell has a second type of search space that has a same index as that of the first search space; a second search space configured through an activated BWP in the second serving cell, where the activated BWP in the first serving cell has a search space that has a same index as that of the second search space and that is explicitly identified as cross component carrier scheduling; a third search space configured by an activated BWP in the second serving cell, where the activated BWP in the first serving cell has a search space that has a same index as that of the third search space and that is implicitly identified as cross component carrier scheduling; and a fourth search space configured by an activated BWP in the second serving cell to monitor a second object, where the activated BWP in the first serving cell has a search space that has a same index as that of the fourth search space, and the second object includes at least one of a second DCI format, a second radio network temporary identifier, and a second time domain location.

In the terminal device 300 in the embodiments of the present disclosure, in a case that a search space of the second serving cell includes a first sub-scheduling resource for self-scheduling of the second serving cell and a second sub-scheduling resource for scheduling of the first serving cell, the first sub-scheduling resource includes some time domain monitoring locations or some candidate PDCCHs determined based on a first preset rule, and the second sub-scheduling resource includes some time domain monitoring locations or some candidate PDCCHs determined based on a second preset rule.

In the terminal device 300 in the embodiments of the present disclosure, the first configuration information further includes other relevant information for performing cross component carrier scheduling on the first serving cell, and the other relevant information includes: a cell identifier of the second serving cell and a carrier indicator field CIF value for scheduling the first serving cell in the second serving cell.

It can be understood that the terminal device 300 provided in this embodiment of the present disclosure can implement the serving cell scheduling method performed by the terminal device 300, and relevant descriptions of the serving cell scheduling method is applicable to the terminal device 300. Details are not described herein again.

In the embodiments of the present disclosure, the first scheduling resource required for performing self-scheduling on the first serving cell and the second scheduling resource required for performing cross component carrier scheduling on the first serving cell may be determined based on the first configuration information from the network device, and it can be learned based on the first configuration information that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

Figure 7:
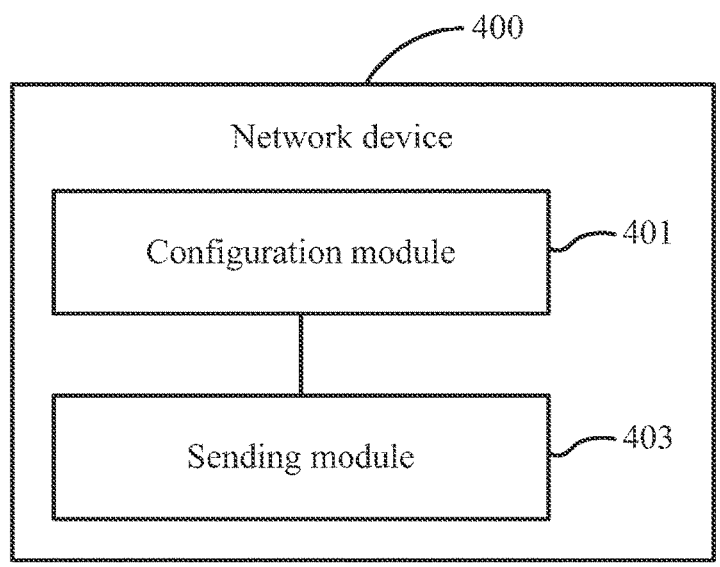
FIG. 7 is a schematic structural diagram of a network device in an embodiment of the present disclosure.

Referring to FIG. 7, an embodiment of the present disclosure provides a network device 400. The network device 400 includes: a configuration module 401 and a sending module 403.

The configuration module 401 is configured to configure first configuration information, where the first configuration information is used to indicate that a first serving cell supports simultaneous execution of self-scheduling and cross component carrier scheduling; and the sending module 403 is configured to send the first configuration information to a terminal device, where the first configuration information is used by the terminal device to determine a first scheduling resource for performing self-scheduling on the first serving cell and a second scheduling resource for performing cross component carrier scheduling on the first serving cell, and the first scheduling resource and the second scheduling resource respectively include corresponding search spaces or candidate PDCCHs.

In the network device 400 in the embodiments of the present disclosure, the configuration module 401 may be configured to: in a case that the first serving cell is a primary serving cell, implicitly indicate, through a first configuration item in the first configuration information, that the first serving cell supports simultaneous execution of self-scheduling and cross component carrier scheduling.

In the network device 400 in the embodiments of the present disclosure, the configuration module 401 may be configured to: in a case that the first serving cell is a primary serving cell or a secondary serving cell, explicitly indicate, through a second configuration item in the first configuration information, that the first serving cell supports simultaneous execution of self-scheduling and cross component carrier scheduling.

In the network device 400 in this embodiment of the present disclosure, the configuration module 401 may be further configured to: configure second configuration information corresponding to a second serving cell, where the second serving cell is used to schedule the first serving cell; and the sending module 403 may be further configured to send the second configuration information to the terminal device, where the second configuration information is used for the terminal device to determine the second scheduling resource.

In the network device 400 in the embodiments of the present disclosure, the configuration module 401 may be further configured to: in a case that a search space of the second serving cell includes a first sub-scheduling resource for self-scheduling of the second serving cell and a second sub-scheduling resource for scheduling of the first serving cell, configure that the first sub-scheduling resource includes some time domain monitoring locations or some candidate PDCCHs determined based on a first preset rule, and configure that the second sub-scheduling resource includes some time domain monitoring locations or some candidate PDCCHs determined based on a second preset rule.

In the network device 400 in the embodiments of the present disclosure, the first configuration information further includes other relevant information for performing cross component carrier scheduling on the first serving cell, and the other relevant information includes: a cell identifier of the second serving cell and a carrier indicator field CIF value for scheduling the first serving cell in the second serving cell.

It can be understood that the network device 400 provided in this embodiment of the present disclosure can implement the serving cell scheduling method performed by the network device 400, and relevant descriptions of the serving cell scheduling method is applicable to the network device. Details are not described herein again.

In the embodiments of the present disclosure, the first configuration information may be provided to the terminal device, so that the first scheduling resource required for performing self-scheduling on the first serving cell and the second scheduling resource required for performing cross component carrier scheduling on the first serving cell may be determined by the terminal device, and the first configuration information may indicate that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

Figure 8:
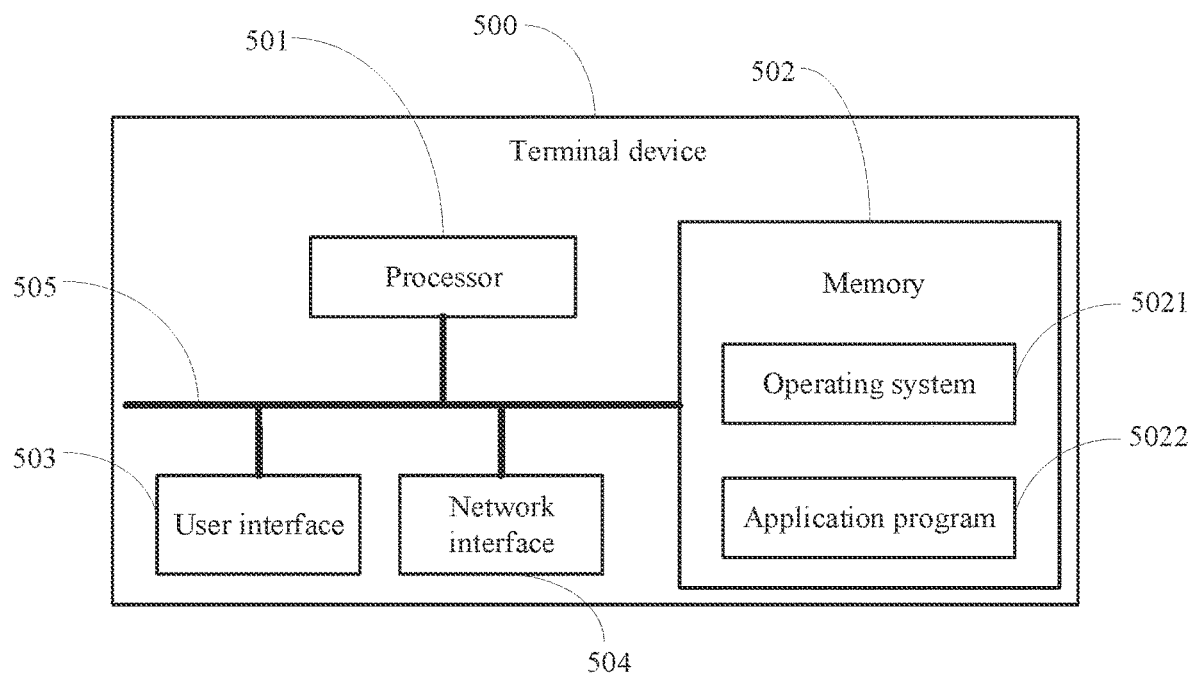
FIG. 8 is a schematic structural diagram of a second terminal device in an embodiment of the present disclosure.

FIG. 8 is a block diagram of a terminal device according to another embodiment of the present disclosure. The terminal device 500 shown in FIG. 8 includes at least one processor 501, a memory 502, at least one network interface 504, and a user interface 503. All components in the terminal device 500 are coupled together through a bus system 505. It may be understood that the bus system 505 is configured to implement connection and communication between these components. In addition to a data bus, the bus system 505 further includes a power bus, a control bus, and a status signal bus. However, for clear description, various buses are marked as the bus system 505 in FIG. 8.

The user interface 503 may include a display, a keyboard, or a clicking device (for example, a mouse, a trackball), a touch panel, or a touchscreen.

It may be understood that the memory 502 in this embodiment of the present disclosure may be a volatile memory or a non-volatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), used as an external cache. By way of example but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DRRAM). The memory 502 of the system and method described in the embodiments of the present disclosure is intended to include but is not limited to these and any other suitable type of memory.

In some implementations, the memory 502 stores the following elements: an executable module or a data structure, or a subset thereof, or an extension set thereof: an operating system 5021 and an application program 5022.

The operating system 5021 includes various system programs, for example, a framework layer, a kernel library layer, and a driver layer, and is configured to implement various basic services and process a hardware-based task. The application program 5022 includes various application programs, for example, a media player and a browser, and is used to implement various application services. A program for implementing the method in the embodiments of the present disclosure may be included in the application program 5022.

In this embodiment of the present disclosure, the terminal device 500 further includes: a computer program stored in the memory 502 and executable on the processor 501. When the computer program is executed by the processor 501, the following steps are implemented: receiving first configuration information sent by a network device, where the first configuration information is used to indicate that a first serving cell supports simultaneous execution of self-scheduling and cross component carrier scheduling; and determining, according to the first configuration information, a first scheduling resource for performing self-scheduling on the first serving cell and a second scheduling resource for performing cross component carrier scheduling on the first serving cell, where the first scheduling resource and the second scheduling resource respectively include corresponding search spaces or candidate PDCCHs.

The foregoing method disclosed in the embodiments of the present disclosure may be applied to the processor 501, or implemented by the processor 501. The processor 501 may be an integrated circuit chip, and has a signal processing capability. In an implementation process, the steps in the foregoing methods may be completed by using an integrated logic circuit of hardware in the processor 501 or an instruction in a form of software. The foregoing processor 501 may be a general-purpose processor, a Digital Signal Processor (DSP), an Application Specific Integrated Circuit (ASIC), a Field Programmable Gate Array (FPGA) or another programmable logic component, a discrete gate or a transistor logic component, or a discrete hardware component. The methods, steps, and logical block diagrams disclosed in the embodiments of the present disclosure may be implemented or executed. The general purpose processor may be a microprocessor, or the processor may be any conventional processor or the like. The steps of the method disclosed with reference to the embodiments of the present disclosure may be directly performed by a hardware decoding processor, or may be performed by using a combination of hardware and software modules in a decoding processor. The software module may be located in a computer-readable storage medium that is mature in the art, such as a random access memory, a flash memory, a read-only memory, a programmable read-only memory, an electrically erasable programmable memory, or a register. The computer-readable storage medium is located in the memory 502, and the processor 501 reads information in the memory 502 and completes the steps in the foregoing method in combination with hardware of the processor. In some embodiments, the computer-readable storage medium stores a computer program, and when the computer program is executed by the processor 501, the steps of the foregoing the serving cell scheduling method in the foregoing embodiment are performed.

It may be understood that the embodiments described in the embodiments of the present disclosure may be implemented by hardware, software, firmware, middleware, microcode, or a combination thereof. For implementation with hardware, the processing unit may be implemented in one or more ASICs, a DSP, a DSP Device (DSPD), a Programmable Logic Device (PLD), a FPGA, a general-purpose processor, a controller, a microcontroller, a microprocessor, another electronic unit for implementing the functions of the present disclosure, or a combination thereof.

For software implementations, the techniques described in embodiments of the present disclosure may be implemented by modules (for example, processes or functions) that perform the functions described in the embodiments of the present disclosure. The software code may be stored in a memory and executed by a processor. The memory may be implemented in or outside the processor.

In the embodiments of the present disclosure, the first scheduling resource required for performing self-scheduling on the first serving cell and the second scheduling resource required for performing cross component carrier scheduling on the first serving cell may be determined based on the first configuration information from the network device, and it can be learned based on the first configuration information that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

The terminal device 500 can implement processes implemented by the terminal device in the foregoing method embodiments. To avoid repetition, details are not described herein again.

Figure 9:
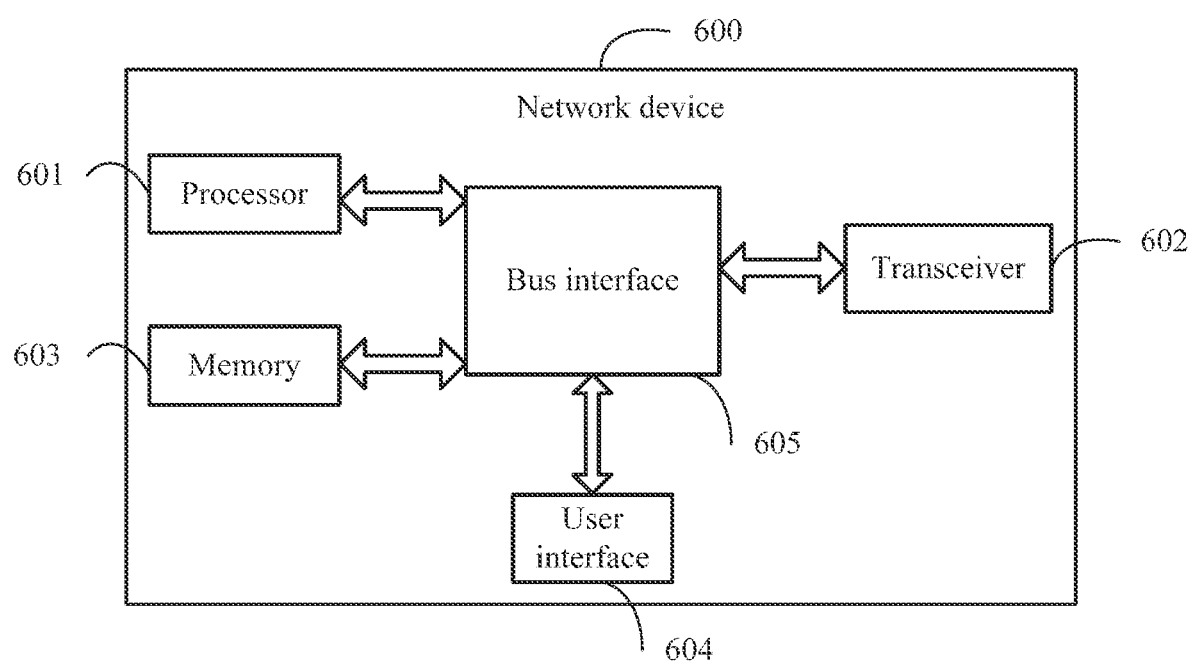
FIG. 9 is a schematic structural diagram of a second network device in an embodiment of the present disclosure.

Referring to FIG. 9, FIG. 9 is a structural diagram of a network device applied to the embodiments of the present disclosure, and the network device can implement details of the foregoing serving cell scheduling method and achieve the same effect. As shown in FIG. 9, a network device 600 includes: a processor 601, a transceiver 602, a memory 603, a user interface 604, and a bus interface 605.

In this embodiment of the present disclosure, the network device 600 further includes: a computer program stored in the memory 603 and executable on the processor 601. When the computer program is executed by the processor 601, the following steps are implemented: configuring first configuration information, where the first configuration information is used to indicate that a first serving cell supports simultaneous execution of self-scheduling and cross component carrier scheduling; and sending the first configuration information to a terminal device, where the first configuration information is used by the terminal device to determine a first scheduling resource for performing self-scheduling on the first serving cell and a second scheduling resource for performing cross component carrier scheduling on the first serving cell, and the first scheduling resource and the second scheduling resource respectively include corresponding search spaces or candidate PDCCHs.

In FIG. 9, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface 605 provides an interface. The transceiver 602 may be a plurality of elements, in other words, includes a transmitter and a receiver, and provides a unit configured to communicate with various other apparatuses on a transmission medium. For different user equipment, the user interface 604 may be further an interface capable of connecting externally and internally a required device. The connected device includes but is not limited to a keypad, a display, a speaker, a microphone, a joystick, and the like.

The processor 601 is responsible for managing the bus architecture and common processing, and the memory 603 may store data used when the processor 601 performs an operation.

In the embodiments of the present disclosure, the first configuration information may be provided to the terminal device, so that the first scheduling resource required for performing self-scheduling on the first serving cell and the second scheduling resource required for performing cross component carrier scheduling on the first serving cell may be determined by the terminal device, and the first configuration information may indicate that the first serving cell supports simultaneous execution of self-scheduling and cross component carrier scheduling. In this way, while the serving cell performs self-scheduling based on the first scheduling resource including the search space or the candidate PDCCH, cross component carrier scheduling may be performed on the serving cell based on the second scheduling resource including the search space or the candidate PDCCH, thereby improving system performance, especially in a dynamic spectrum sharing scenario.

An embodiment of the present disclosure further provides a terminal device, including a processor, a memory, and a computer program stored in the memory and executable on the processor. When the computer program is executed by the processor, the processes of the serving cell scheduling method shown in the foregoing embodiments are implemented, and a same technical effect can be achieved. To avoid repetition, details are not described herein.

Embodiments of the present disclosure further provide a computer readable storage medium. The computer readable storage medium stores a computer program. When the computer program is executed by a processor, the processes of the serving cell scheduling method applied to a terminal device in the foregoing embodiments are implemented, and a same technical effect can be achieved. To avoid repetition, details are not described herein. The computer readable storage medium may be a Read-Only Memory (ROM), a Random Access Memory (RAM), a magnetic disk, an optical disc, or the like.

An embodiment of the present disclosure further provides a network device, including a processor, a memory, and a computer program stored in the memory and executable on the processor. When the computer program is executed by the processor, the processes of the serving cell scheduling method shown in the foregoing embodiments are implemented, and a same technical effect can be achieved. To avoid repetition, details are not described herein.

Embodiments of the present disclosure further provide a computer readable storage medium. The computer readable storage medium stores a computer program. When the computer program is executed by a processor, the processes of the serving cell scheduling method applied to a network device in the foregoing embodiments are implemented, and a same technical effect can be achieved. To avoid repetition, details are not described herein. The computer readable storage medium may be a ROM, a RAM, a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by the statement "including a . . . " does not exclude another same element in this process, method, article, or apparatus that includes the element.

By means of the foregoing description of the embodiments, a person skilled in the art may clearly understand that the method in the foregoing embodiments may be implemented by software in addition to a necessary universal hardware platform. The method in the foregoing embodiments may also be implemented by hardware. However, in many cases, the former is an exemplary embodiment. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the objective of the present disclosure and the protection scope according to claims, all of which fall within the protection of the present disclosure.

The invention claimed is:

1. A serving cell scheduling method, performed by a terminal device, comprising:
   receiving first configuration information sent by a network device, wherein the first configuration information is used to indicate that a first serving cell simultaneously supports execution of self-scheduling and cross component carrier scheduling;
   determining, according to the first configuration information, a first scheduling resource for performing the self-scheduling on the first serving cell and a second scheduling resource for performing the cross component carrier scheduling on the first serving cell, wherein the first scheduling resource and the second scheduling resource comprise corresponding search spaces or candidate Physical Downlink Control Channels (PDCCHs); and
   receiving second configuration information that corresponds to a second serving cell and that is sent by the network device, wherein the second serving cell is used to schedule the first serving cell,
   wherein determining, according to the first configuration information, the second scheduling resource for performing the cross component carrier scheduling on the first serving cell comprises:
   determining the second scheduling resource according to the first configuration information and the second configuration information.

2. The serving cell scheduling method according to claim 1, wherein in when the first serving cell is a primary serving cell, the first configuration information comprises a first configuration item, and that the first serving cell simultaneously supports execution of the self-scheduling and the cross component carrier scheduling is implicitly indicated by the network device to the terminal device through the first configuration item.

3. The serving cell scheduling method according to claim 1, wherein in when the first serving cell is a primary serving cell or a secondary serving cell, the first configuration information comprises a second configuration item, and that the first serving cell simultaneously supports execution of the self-scheduling and the cross component carrier scheduling is explicitly indicated by the network device to the terminal device through the second configuration item.

4. The serving cell scheduling method according to claim 1, wherein the first scheduling resource comprises at least one of the following:
   a first type of search space configured through an activated Bandwidth Part (BWP) in the first serving cell;
   a search space that is of search spaces corresponding to an activated BWP in the first serving cell and that is explicitly identified as self-scheduling;

a search space that is of search spaces corresponding to an activated BWP in the first serving cell and that is implicitly identified as self-scheduling; or a search space that is configured through an activated BWP in the first serving cell to monitor a first object, wherein the first object comprises at least one of a first Downlink Control Information (DCD) format, a first radio network temporary identifier, or a first time domain location.

5. The serving cell scheduling method according to claim 1, further comprising:
determining the second serving cell for scheduling the first serving cell.

6. The serving cell scheduling method according to claim 5, wherein the second scheduling resource comprises at least one of the following:
a first search space configured through an activated Bandwidth Part (BWP) in the second serving cell, wherein the activated BWP in the first serving cell has a second type of search space that bas a same index as that of the first search space;
a second search space configured through an activated BWP in the second serving cell. wherein the activated BWP in the first serving cell has a search space that has a same index as that of the second search space and that is explicitly identified as cross component carrier scheduling;
a third search space configured by an activated BWP in the second serving cell, wherein the activated BWP in the first serving cell has a search space that has a same index as that of the third search space and that is implicitly identified as cross component carrier scheduling; or
a fourth search space configured by an activated BWP in the second serving cell to monitor a second object, wherein the activated BWP in the first serving cell has a search space that has a same index as that of the fourth search space, and the second object comprises at least one of a second Downlink Control Information (DCI) format, a second radio network temporary identifier, or a second time domain location.

7. The serving cell scheduling method according to claim 5, wherein when a search space of the second serving cell comprises a first sub-scheduling resource for the self-scheduling of the second serving cell and a second sub-scheduling resource for scheduling of the first serving cell,
the first sub-scheduling resource comprises time domain monitoring locations or candidate PDCCHs determined based on a first preset rule, and the second sub-scheduling resource comprises time domain monitoring locations or candidate PDCCHs determined based on a second preset rule.

8. The serving cell scheduling method according to claim 5, wherein the first configuration information further comprises other relevant information for performing the cross component carrier scheduling on the first serving cell, wherein the other relevant information comprises: a cell identifier of the second serving cell and a Carrier Indicator Field (CIF) value for scheduling the first serving cell in the second serving cell.

9. A network device, comprising: a memory having a computer program stored therein; and a processor, wherein the computer program, when executed by the processor, causes the processor to perform a serving cell scheduling method, comprising:
configuring first configuration information, wherein the first configuration information is used to indicate that a first serving cell simultaneously supports execution of self-scheduling and cross component carrier scheduling;
sending the first configuration information to a terminal device, wherein the first configuration information is used by the terminal device to determine a first scheduling resource for performing the self-scheduling on the first serving cell and a second scheduling resource for performing the cross component carrier scheduling on the first serving cell, and the first scheduling resource and the second scheduling resource comprise corresponding search spaces or candidate Physical Downlink Control Channels (PDCCHs);
configuring second configuration information corresponding to a second serving cell wherein the second serving cell is used to schedule the first serving cell; and
sending the second configuration information to the terminal device, wherein the second configuration information is used for the terminal device to determine the second scheduling resource.

10. The network device according to claim 9, wherein when the first serving cell is a primary serving cell, the first serving cell simultaneously supports execution of the self-scheduling and the cross component carrier scheduling is implicitly indicated through a first configuration item in the first configuration information.

11. The network device according to claim 9, wherein when the first serving cell is a primary serving cell or a secondary serving cell, the first serving cell simultaneously supports execution of the self-scheduling and the cross component carrier scheduling is explicitly indicated through a second configuration item in the first configuration information.

12. The network device according to claim 9, wherein when a search space of the second serving cell comprises a first sub-scheduling resource for the self-scheduling of the second serving cell and a second sub-scheduling resource for scheduling of the first serving cell, the method further comprises:
configuring that the first sub-scheduling resource comprises time domain monitoring locations or candidate PDCCHs determined based on a first preset rule, and configuring that the second sub-scheduling resource comprises time domain monitoring locations or candidate PDCCHs determined based on a second preset rule.

13. The network device according to claim 9, wherein the first configuration information further comprises other relevant information for performing the cross component carrier scheduling on the first serving cell, wherein the other relevant information comprises: a cell identifier of the second serving cell and a Carrier Indicator Field (CIF) value for scheduling the first serving cell in the second serving cell.

14. A terminal device, comprising: a memory having a computer program stored thereon; and a processor, wherein the computer program, when executed by the processor, causes the processor to perform operations comprising:
receiving first configuration information sent by a network device, wherein the first configuration information is used to indicate that a first serving cell simultaneously supports execution of self-scheduling and cross component carrier scheduling;
determining, according to the first configuration information, a first scheduling resource for performing the self-scheduling on the first serving cell and a second scheduling resource for performing the cross component carrier scheduling on the first serving cell, wherein the first scheduling resource and the second scheduling resource comprise corresponding search spaces or candidate Physical Downlink Control Channels (PDCCHs); and receiving second configuration information that corresponds to a second serving cell and that is sent by the network device. wherein the second serving cell is used to schedule the first serving cell, wherein determining, according to the first configuration information, the second scheduling resource for performing the cross component carrier scheduling on the first serving cell comprises:

determining the second scheduling resource according to the first configuration information and the second configuration information.

15. The terminal device according to claim 14, wherein when the first serving cell is a primary serving cell, the first configuration information comprises a first configuration item, and that the first serving cell simultaneously supports execution of the self-scheduling and the cross component carrier scheduling is implicitly indicated by the network device to the terminal device through the first configuration item.

16. The terminal device according to claim 14, wherein when the first serving cell is a primary serving cell or a secondary serving cell, the first configuration information comprises a second configuration item, and that the first serving cell simultaneously supports execution of the self-scheduling and the cross component carrier scheduling is explicitly indicated by the network device to the terminal device through the second configuration item.

17. The terminal device according to claim 14, wherein the first scheduling resource comprises at least one of the following:
- a first type of search space configured through an activated Bandwidth Part (BWP) in the first serving cell;
- a search space that is of search spaces corresponding to an activated BWP in the first serving cell and that is explicitly identified as self-scheduling;
- a search space that is of search spaces corresponding to an activated BWP in the first serving cell and that is implicitly identified as self-scheduling; or
- a search space that is configured through an activated BWP in the first serving cell to monitor a first object, wherein the first object comprises at least one of a first Downlink Control Information (DCI) format, a first radio network temporary identifier, or a first time domain location.

18. The terminal device according to claims 14, wherein the operations further comprise:
determining a second serving cell for scheduling the first serving cell.

* * * * *